ns Lemke, Asnieres, France

United States Patent [19]
Lemke

[11] 3,887,361
[45] June 3, 1975

[54] TREATMENT OF ORGANIC EFFLUENTS FROM THE HALCON PROCESS TO PRECIPITATE THE METAL USED AS CATALYST

[75] Inventor: Hans Lemke, Asnieres, France

[73] Assignee: Produits Chimiques Ugine Kuhlmann, Saint-Denis, France

[22] Filed: Feb. 15, 1973

[21] Appl. No.: 332,875

[30] Foreign Application Priority Data
Feb. 29, 1972  France ............................... 72.06864

[52] U.S. Cl. ................... 75/108; 75/121; 252/414; 260/348.5 L
[51] Int. Cl. .......................... C22b 3/00; C07d 1/08
[58] Field of Search .............. 75/108, 121; 252/414; 260/348.5 L

[56] References Cited
UNITED STATES PATENTS

| 3,434,975 | 3/1969 | Sheng et al. | 260/348.5 L |
|---|---|---|---|
| 3,573,226 | 3/1971 | Sorgenti | 260/348.5 L |
| 3,666,777 | 5/1972 | Sorgenti | 260/348.5 L |

*Primary Examiner*—Herbert T. Carter
*Attorney, Agent, or Firm*—Pennie & Edmonds

[57] ABSTRACT

A process for treating the residual organic effluents derived from the process of epoxidation of olefins with hydroperoxides in the presence of a basic molybdenum, tungsten, titanium, vanadium, niobium or tantalum catalyst is disclosed which comprises:
a. heating the effluents or distillation residues of the effluents with from about 5 to 50 percent by weight of tertiarybutyl alcohol to a temperature between about 100°C to 300°C in a closed vessel or under reflux; and
b. separating the resulting precipitate containing substantially all of the molybdenum, tungsten, titanium, vanadium, niobium or tantalum metal originally present in the effluents or distillation residues of the effluents.

6 Claims, No Drawings

TREATMENT OF ORGANIC EFFLUENTS FROM THE HALCON PROCESS TO PRECIPITATE THE METAL USED AS CATALYST

BACKGROUND OF THE INVENTION

I. Field of the Invention

This invention relates to the treatment of effluents produced by the Halcon process for manufacturing epoxides for the removal of the metal catalyst contained in the effluents.

II. Description of the Prior Art

The Halcon process is based on the reaction of hydroperoxides with olefins in the presence of selected catalysts leading to high yields of mixtures of alcohol and epoxide as in the following case where the olefin is propylene:

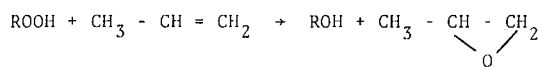

When according to this process propylene is reacted with hydroperoxides of ethylbenzene, ourrene or isobutane propylene oxide is obtained with transformation levels up to 95 percent by using catalysts selected from the basic organic salts of molybdenum, tungsten, titanium, vanadium, niobium or tantalum, as for example the naphthenates and acetylacetonates of the aforesaid metals. The molybdenum salts have been revealed to be the most interesting catalysts and are the ones which are employed most often.

The Halcon process has been disclosed in numerous patents to Halcon International, Inc.; in particular, French Pat. Nos. 1,460,520, 1,462,490, 1,465,902, 1,469,326, 1,487,076, 1,495,694 and 1,548,367 are noted. These patents disclose how the propylene, propylene oxide, hydrocarbon and alcohol are separated by distillation. The residue of this distillation is the organic effluent, the treatment of which is the subject matter of the invention herein.

The existence of this effluent comprising by-products of the Halcon process and containing the metal utilized as catalyst poses a problem with respect to the elimination of the metal. It is impossible to burn the effluent without risking pollution of the atmosphere by the metal oxides in the fumes unless certain precautions requiring the use of rather burdensome apparatus are employed. This problem is especially acute when molybdenum is used because the elimination of molybdenum oxide from the fumes is particularly required by the health authorities of industrial countries.

SUMMARY OF THE INVENTION

During the course of investigating the residual organic effluents given off by a plant manufacturing propylene oxide by means of the Halcon process using a molybdenum catalyst, a simple and highly effective method has been discovered which provides nearly complete elimination of molybdenum from these effluents. This process rests upon the finding that the molybdenum or other catalyst metal which is present in the effluents can be precipitated almost quantitatively in an unobvious and unexpected fashion by a treatment carried out at temperatures from about 100° to 300°C in an enclosed vessel or under reflux. The resulting precipitate which contains substantially all of the metals present is then separated by any one of several known and conventional means.

According to the instant invention, the residual organic effluents derived from the process of epoxidation of olefins with hydroperoxides in the presence of a basic molybdenum, tungsten, titanium, vanadium, niobium, or tantalum catalyst are treated by the process which comprises adding to the effluents or the distillation residues of these effluents from about 5 to 50 percent by weight of tertiarybutyl alcohol if the effluents or distillation residues do not already contain such an amount of this alcohol, heating the effluents or the mixture to a temperature between about 100°C to 300°C in a closed vessel or under reflux, and separating the resulting precipitate containing the metals present in the effluent.

DESCRIPTION OF THE PREFERRED EMBODIMENTS

It has been observed in one particularly interesting embodiment of the process of this invention that treatment of the residual organic effluent from the Halcon process in an autoclave at temperatures of from about 100° to 300°C under a pressure of from 5 to 50 bars for from about 2 to 3 hours results in the elimination of more than 99 percent of the molybdenum from the effluent in the form of a precipitate and after extraction with toluene, consists of about 50 percent molybdenum.

In the same manner, heating of the effluent under reflux at atmospheric pressure provides a precipitate containing the greater part of the molybdenum present in the effluent. By contrast, when these same effluents are distilled up to a temperature of 300°C in a still, no precipitate forms. The simple heating of the effluent with the elimination of a part of these components in the form of distillate does not therefore permit the separation of the catalyst metal by precipitation. The only result is a concentration of molybdenum which is limited by the impossiblity of eliminating all of the organic products due to their high molecular weight.

On the contrary, it has been discovered that the metal contained in the distillation residues of the Halcon process can be precipitated by carrying out the thermal treatment in the presence of appropriate quantities of tertiarybutyl alcohol. As this composition is found to be generally present in the Halcon process effluents, one can suppose that it is tertiobutyl alcohol or its decomposition products which provokes the precipitation of molybdenum during the thermal treatment of the effluents. It is sufficient to add to the distillation residues of these effluents from about 5 to 50 percent tertiarybutyl alcohol and thereafter carry out the heating of the resulting mixture at temperatures from about 100° to 300°C in a closed vessel or under reflux as noted hereinabove.

This particular mode of carrying out the process of the invention permits treatment of the Halcon process effluents after a prior separation by distillation.

The molybdenum precipitate according to the process herein can be treated according to any one of several known and conventional methods for regenerating the molybdenum. Moreover, as this molybdenum is very finely divided, it can be recycled in the Halcon process as such, or optionally, after dissolution in such organic acids as the pelargonic, lauric, naphthenic acids and the acids obtained in the process, known as the Oxo process, for the production of oxygenated organic derivatives.

The treatment under pressure which is an advantageous manner of carrying out the process can be conducted batch-wise in an autoclave or continuously in reactors heated to temperatures from about 100° to 300°C under a pressure of from about 5 to 50 bars. The thermal treatment can be carried out in the presence of such reducing gases as hydrogen or carbon monoxide, or inert gases such as nitrogen or carbon dioxide.

The process for treating the Halcon process effluents according to this invention can be illustrated using the residual products for preparing propylene oxide by the Halcon process which have been filtered before use.

Examples I to VII illustrate the treatment of Halcon effluents in a closed vessel or under reflux; Example VIII (a) and (b) demonstrates that there is no metal-containing precipitate produced during distillation of these effluents containing less than about 5 percent tertiarybutyl alcohol even following thermal treatment, but as shown in Examples VIII (c) and IX the treatment of the distillation residue of the Halcon process in the presence of an appropriate quantity of tertiarybutyl tertiobutyl alcohol results in the elimination of substantially all of the metal catalyst present in the effluents.

While the Examples illustrate the method of this invention using Halcon process effluents containing molybdenum catalyst, it is understood that other metal catalysts including tungsten, titanium, vanadium, niobium or tantalum can be readily and substantially removed from the Halcon effluents which contain them in the same manner as set forth in the Examples.

EXAMPLE I 100 gm. of residual Halcon products containing 0.97 percent of dissolved molybdenum were placed under a nitrogen atmosphere in a stainless steel autoclave of 0.5 liters capacity. After closing, the autoclave was heated to the experimental temperature by means of an electric furnace and the assembly was stirred with a balanced agitator. At the end of the treatment, the autoclave was cooled and its contents filtered.

The measurement of the molybdenum in the filtrate, carried out by polarography, gave the following results:

| Experimental Conditions | | | Amount of Mo in the filtrate % | Total elimination of Mo % |
|---|---|---|---|---|
| Experimental Temperature °C | Duration of Heating Hours | Pressure Bars | | |
| 150 | 2.5 | 25 | 0.066 | 93.2 |
| 200 | 1.5 | 32 | 0.032 | 96.3 |
| 250 | 2 | 63 | 0.021 | 97.9 |

EXAMPLE II 491 gm. of residual products of the Halcon process containing 0.97 percent dissolved molybdenum were placed under a nitrogen atmosphere in a stainless steel autoclave of 1 liter capacity. After closing, the autoclave was heated by means of an electric furance and the assembly was stirred with a balanced agitator. Within 50 minutes the temperature increased to 200°C and the pressure to 28 bars. This temperature was maintained for two hours at the end of which a pressure of 37 bars was established. After cooling to 20°C, the pressure stabilized at 8 bars.

After progressively reducing the pressure within the autoclave, 6 liters of a gaseous mixture containing 26.8 percent by volume of $CO_2$, 18.6 percent unsaturated hydrocarbons, 39 percent CO, 2.5 percent $H_2$, 3.5 percent saturated hydrocarbons and 9.6 percent $N_2$ were recovered.

After filtering the contents of the autoclave under low pressure, 18.5 gm. of a black precipitate containing 24.3 percent molybdenum were obtained. The molybdenum content of the filtrate was measured as 0.0047 percent thus corresponding to a 99.5 percent elimination of molybdenum in the treated effluents.

The black precipitate was extracted in a Soxhlet apparatus with toluene. After drying, a very light powder containing 51 percent molybdenum was recovered. Following heating of 6 gm. of this powder with 50 ml. of synthetic decanoic acid under reflux, the entire quantity of the solid product was dissolved.

EXAMPLE III 488 gm. of residual products from the Halcon process containing 0.97 percent dissolved molybdenum were placed in a nitrogen atmosphere in a stainless steel autoclave of 1 liter capacity. After closing, the autoclave was subjected to a pressure of 10 bars of hydrogen and heated with agitation as set forth in Example II. In raising the temperature to 205°C, a pressure of 51 bars was established. After two hours of treatment under these conditions, the autoclave was cooled to 19°C. The pressure at this temperature was 18.5 bars.

Analysis of the gas recovered through expansion gave the following results: 12.2 percent of $CO_2$, 6.8 percent of unsaturated hydrocarbons, 23 percent of CO, 55.2 percent of $H_2$, 2.8 percent of saturated hydrocarbons and $N_2$.

Following filtration of the contents of the autoclave, 22.6 gm. of a black precipitate titrating 20.3 percent molybdenum was obtained. The amount of molybdenum measured in the filtrate was 0.005 percent thus corresponding to an elimination of 99.5 percent of the molybdenum present in the treated effluents.

EXAMPLE IV

Residual Halcon products containing 0.97 percent dissolved molybdenum were continuously treated in a stainless steel tube enclosed within a heating jacket. The tube possessed an interior diameter of 12 mm, a length of 2m, had a capacity of 230 ml, was connected at its lower part to a metering pump and at its upper part to a condensor descending along a separator.

After the jacket was heated to 207°C by means of a thermally controlled fluid, the tube was subjected to a pressure of 34 bars of nitrogen.

The residual products to be treated were then introduced through the lower part of the tube by the metering pump while a pressure of from 34 to 37 bars and a flow of 100 or 200 ml/hour were maintained.

Following passage through the tube the resulting product was periodically withdrawn from the separator.

The products thus treated were filtered and the molybdenum was measured in the filtrate and in the black filter cake recovered upon filtration and washing with toluene.

The following results were obtained:

| Rate of flow of Liquid ml/hour | Amount of Mo % in the precipitate | Amount of Mo % in the filtrate | Total elimination of Mo % |
| --- | --- | --- | --- |
| 200 | 54 | 0.010 | 98.7 |
| 100 | 52 | 0.08 | 99.2 |

EXAMPLE V 82 gm. of Halcon residual products containing 0.97 percent of dissolved molybdenum were heated in a nitrogen atmosphere under reflux in a 250 ml flask at a temperature of 121°C for three hours. Following cooling, the product was filtered and 2.9 gm. of a black precipitate was recovered. The amount of molybdenum in the filtrate was measured to be 0.34 percent corresponding to a diminution of 65 percent of molybdenum present in the treated liquid.

EXAMPLE VI 98 gm. of Halcon residual products containing 0.97 percent dissolved molybdenum were treated under substantially the same conditions as set forth in Example V but after heating under reflux for eight hours, 3.12 gm. of a black precipitate was recovered. There was 0.24 percent molybdenum in the filtrate corresponding to a diminution of 75 percent of the amount of molybdenum in the treated liquid.

EXAMPLE VII 500.8 gm. of Halcon residual products containing 0.42 percent dissolved molybdenum were placed under a nitrogen atmosphere in a stainless steel autoclave of one liter capacity. After closing, the autoclave was heated by means of an electric furnace and the assembly was stirred with a balanced agitator. A pressure of 39 bars was established at a temperature of 200°C.

This temperature was maintained for two hours. After cooling to 20°C, the pressure within the autoclave was relieved by passing the gas over a trap cooled to $-77°C$ and 12.3 gm. of condensable products and 5 liters of gas were recovered.

0.002 percent of molybdenum was measured in the filtered products. The precipitate was washed on a filter with 100 gm. toluene and then treated for seven hours under reflux with 54 gm. of $C_{10}$ acids derived from the Oxo process, i.e. the acids resulting from the Oxo process for manufacturing oxygenated organic derivatives.

Following filtration, 54 gm. of a solution containing 3.35 percent of molybdenum were obtained thus corresponding to a recovery of 86 percent of the molybdenum originally present.

EXAMPLE VIII

This Example illustrates in (a) and (b) the result of treating Halcon process effluents from which the tertiarybutyl alcohol has been previously removed by distillation, (c) illustrates the method of this invention in which the distillate containing tertiarybutyl alcohol is added back to the residue and the mixture is then heated.

a. 2,000 gm. of Halcon residual products containing 0.042 percent dissolved molybdenum were placed in a three liter flask having its central tube equipped with a descending Liebig condensor. Following heating of the contents of the flask by means of a heating mantle, the product was separated into three fractions: a top fraction of 10 percent, a principal fraction of 47.3 percent and a residue of 31.3 percent. The distillation lead to the formation of 11.4 percent of volatile products which were recovered in a trap.

No precipitate formed during the distillation and the amount of molybdenum in the residue was 1.3 percent.

b. 100 gm. of the residue resulting from the distillation described in Example VIII (a) were treated in an autoclave as described in Example I. The pressure increased to 7 bars without any precipitate being formed.

c. 100 gm. of residue and 32 gm. of the top fraction containing tertiarybutyl alcohol obtained from the distillation described in Example VIII (a) were treated in an autoclave described in Example VIII (a). The pressure increased to 32 bars. 11.8 gm. of a wet precipitate formed which were recovered by filtration. There was 0.016 percent of molybdenum present in the filtered product thus corresponding to an elimination of 98.8 percent of molybdenum contained in the distillation residue.

EXAMPLE IX

A Halcon process residual product containing 0.4 percent dissolved molybdenum was distilled as in Example VIII. The residue representing 56.5 percent of the starting product contained 0.71 percent molybdenum.

After treating 100 gm. of this residue under the conditions set forth in the following table in the presence of tertiarybutyl alcohol for 2 hours in an autoclave, the major part of the molybdenum precipitated:

| Tertiarybutyl Alcohol added to the distillation residue gm | Experimental Conditions | | Molybdenum in the treated product % |
| --- | --- | --- | --- |
| | Temperature °C | Pressure bars | |
| 10.5 | 200–204 | 16.5 | 0.039 |
| 20.2 | 204–206 | 22 | 0.010 |

I claim:

1. The process for treating the residual organic effluents derived from the process of epoxidation of olefins with hydroperoxides in the presence of a basic organic salt of molybdenum, tungsten, titanium, vanadium niobium or tantalum catalyst so as to precipitate the catalyst which comprises:
    a. heating the effluents or distillation residues of the effluents with from about 5 to 50 percent by weight of tertiarybutyl alcohol to a temperature between about 100°C to 300°C in a closed vessel or under reflux; and
    b. separating the resulting precipitate containing substantially all of the molybdenum, tungsten, titanium, vanadium, niobium or tantalum metal originally present in the effluent or distillation residues of the effluents.

2. The process of claim 1 in which the effluents or distillation residues of the effluents contain less than about 5 percent tertiarylbutyl alcohol and an amount of tertiarybutyl alcohol is added thereto prior to step (a) which is sufficient to bring the level of tertiarybutyl alcohol to from about 5 to 50 percent by weight.

3. The process of claim 1 carried out in an autoclave at a pressure of from about 5 to 50 bars.

4. The process of claim 1 wherein heating is carried under reflux at a temperature between about 100°C and 300°C.

5. The process of claim 1 wherein the metal present is molybdenum.

6. In the process for the epoxidation of olefins with hydroperoxides in the presence of a basic organic salt of molybdenum, tungsten, titanium, vanadium, niobium or tantalum catalyst, the improvement thereof comprising the treatment of the effluents or distillation residues of the effluents by the process of claim 1.

* * * * *

UNITED STATES PATENT AND TRADEMARK OFFICE
CERTIFICATE OF CORRECTION

PATENT NO. : 3,887,361
DATED : June 3, 1975
INVENTOR(S) : Hans Lemke

It is certified that error appears in the above-identified patent and that said Letters Patent are hereby corrected as shown below:

Column 1, line 24, delete "ourrene" and substitute therefore -- cumene --;

Column 2, line 24, after "from" insert -- about --;
line 48, delete "tertiobutyl" and substitute therefore -- tertiarybutyl --.

Column 3, line 17, delete "demonstrates" and substitute therefore -- demonstrate --;
lines 23 and 24, delete "tertiobutyl";

Column 6, line 63, delete "tertiarylbutyl" and substitute therefore -- tertiarybutyl --.

Signed and Sealed this thirtieth Day of September 1975

[SEAL]

Attest:

RUTH C. MASON
Attesting Officer

C. MARSHALL DANN
Commissioner of Patents and Trademarks